(12) United States Patent
Mao (10) Patent No.: US 11,872,483 B2
(45) Date of Patent: Jan. 16, 2024

(54) GAME OBJECT CONTROL SYSTEM AND METHOD, AND COMPUTER-READABLE STORAGE MEDIUM

(71) Applicant: SHANGHAI LILITH NETWORK TECHNOLOGY COMPANY LIMITED, Shanghai (CN)

(72) Inventor: Yifan Mao, Shanghai (CN)

(73) Assignee: SHANGHAI LILITH NETWORK TECHNOLOGY COMPANY LIMITED, Shanghai (CN)

(*) Notice: Subject to any disclaimer, the term of this patent is extended or adjusted under 35 U.S.C. 154(b) by 16 days.

(21) Appl. No.: 17/764,500

(22) PCT Filed: May 8, 2021

(86) PCT No.: PCT/CN2021/092262
§ 371 (c)(1),
(2) Date: Mar. 28, 2022

(87) PCT Pub. No.: WO2022/105142
PCT Pub. Date: May 27, 2022

(65) Prior Publication Data
US 2023/0173383 A1    Jun. 8, 2023

(30) Foreign Application Priority Data

Nov. 20, 2020   (CN) .......................... 202011312929.X (51) Int. Cl.
*A63F 13/44*    (2014.01)
*A63F 13/56*    (2014.01)
(Continued)

(52) U.S. Cl.
CPC ............ *A63F 13/428* (2014.09); *A63F 13/35* (2014.09); *A63F 13/44* (2014.09); *A63F 13/56* (2014.09)

(58) Field of Classification Search
None
See application file for complete search history.

(56) References Cited

U.S. PATENT DOCUMENTS

| | | | | |
|---|---|---|---|---|
| 2002/0045470 A1* | 4/2002 | Atsumi | ................... | A63F 13/56 463/9 |
| 2008/0009352 A1* | 1/2008 | Aoyama | ................. | A63F 13/12 463/43 |
| 2013/0331182 A1* | 12/2013 | Tanzawa | ............. | A63F 13/2145 463/31 |

* cited by examiner

Primary Examiner — Damon J Pierce
(74) Attorney, Agent, or Firm — Amster, Rothstein & Ebenstein LLP (57) ABSTRACT

The present invention provides a game object control system and method, and a computer-readable storage medium. The game object control system comprises a server and an intelligent terminal. The intelligent terminal comprises: a state machine management module that receives group data; a queue management module that receives object data; a control module, wherein when the intelligent terminal does not receive the group data and object data within a preset period time domain, the control module generates a first movement instruction, a first action instruction, a second movement instruction, and a second action instruction based on the group data and the object data in a previous period; and a battle management module that controls the object group to move based on the first movement instruction and perform an attack action, and controls the game object to move based on the second movement instruction and perform an attack action. After the above technical solution is adopted, through a prediction and catch-up mechanism of the intelligent terminal, interactive animation and data synchronization of the game objects can still be presented in the intelligent terminal even in a case of network fluctuations.

9 Claims, 2 Drawing Sheets

(51) Int. Cl.
*A63F 13/428* (2014.01)
*A63F 13/35* (2014.01)

GAME OBJECT CONTROL SYSTEM AND METHOD, AND COMPUTER-READABLE STORAGE MEDIUM

TECHNICAL FIELD

The present invention relates to the field of game control, in particular to a game object control system and method, and a computer-readable storage medium.

BACKGROUND

With continuous development of Internet technology, a game industry is continuously developed, and a game player pays particular attention to game AI in a game and performance of other players in the game. A SLG game is used as an example. In a strategy layout process and a gaming process, game objects controlled by players and non-player characters (NPC) of the game keep moving during the gaming process, or make an attack action on other game objects during the movement, to show users an interactive screen of the game.

With increasing requirements of the users for the SLG game, thousands of units on a same screen continuously appear in a seamless large map environment in turn-based or multi-turn-based or real-time battles. Due to the increase in the number of game objects, the smooth battle effect of each unit synchronized in the same screen cannot be guaranteed.

Moreover, if communication between a server and an intelligent terminal is interrupted, stuck, or unstable, the battle of thousands of units cannot be sent to the intelligent terminal in a consistent manner. Generally, the solution is to stop the movement of the game object, and to reload after waiting for the network to become stabilized, consequently bringing extremely poor gaming experience to the users.

Therefore, there is a need for a new type of game object control system and method, and a computer-readable storage medium, which exhibit complex and spectacular combat interactive manifestation with lower data transmission.

SUMMARY

To overcome the technical shortcomings, an objective of the present invention is to provide a game object control system and method, and a computer-readable storage medium. Through a prediction and catch-up mechanism of an intelligent terminal, interactive animation and data synchronization of game objects can still be presented in the intelligent terminal even in a case of network fluctuations.

The present invention discloses a game object control system, comprising a server and an intelligent terminal, wherein the server generates group data for an object group including a plurality of game objects and object data for the game object, and the intelligent terminal is in communication connection with the server, and receives the group data and the object data issued by the server, wherein the intelligent terminal comprises:
a state machine management module that receives the group data, and parses the group data into first movement state data and first action state data;
a queue management module that receives the object data, and parses the object data into second movement state data and second action state data;
a control module that is respectively connected to the state machine management module and the queue management module, where when the intelligent terminal does not receive the group data and the object data within a preset period time domain, the control module generates, based on the group data and the object data in a previous period, a first movement instruction and a first action instruction for the object group, and a second movement instruction and a second action instruction for the game object;
a battle management module that controls the object group to move based on the first movement instruction, controls the game object to move based on the second movement instruction, controls the object group to perform an attack action on another object group based on the first action instruction, and controls the game object to perform an attack action on another object group based on the second action instruction.

Preferably, the first movement instruction comprises: current position information, a first movement direction, a first moving speed, a first movement position in a next period time domain, a duration of a period time domain, a first speed correction constant and a first target position of the object group;
the first action instruction comprises: attack status information and skill status information of the object group;
the second movement instruction comprises: current position information, a second movement direction, a second moving speed, a second movement position in a next period time domain, a duration of a period time domain, a second speed correction constant and the second target position of the game object; and
the second action instruction comprises: attack damage information and skill status information of the game object, where
the current position information of the game object is offset by an offset distance by using the current position information of the object group as a center;
the second movement position is offset by the offset distance by using the first movement position as a center;
the second target position is offset by the offset distance by using the first target position as a center; and
the first movement direction is the same as the second movement direction, the first moving speed is the same as the second moving speed, and the first speed correction constant is the same as the second speed correction constant.

Preferably, when the battle management module controls the object group and the game object to move, calculating whether a movement distance between the current position information of the game object and the second target position is less than a preset distance;
when the moving distance between the current position information of the game object and the second target position is greater than the preset distance, directly changing the current position information to the second target position;
when the moving distance between the current position information of the game object and the second target position is less than the preset distance, determining whether an included angle between a vector in which the second moving direction is located and a vector in which the game object and the second target position are located is less than 90°;
when the included angle between the vector in which the second moving direction is located and the vector in which the game object and the second target position are located is less than 90°, controlling the second moving speed and a distance between the current position information and the second target position in a directly proportional manner based on the second speed correction constant; and when the included angle between the vector in which the second moving direction is located and the vector in which the game object and the second target position are located is greater than or equal to 90°, controlling the second moving speed and a distance between the current position information and the second target position in an inversely proportional manner based on the second speed correction constant.

Preferably, the attack status information comprises identification information of an attacked object group;

the attack damage information comprises:

remaining state information of game objects in the attacked object group after the game object executes the second action instruction;

state change information of the attacked object group after the game object executes the second action instruction; and number change information of game objects in the attacked object group after the game object executes the second action instruction; and a start position and an end position of an attack action when the game object executes the second action instruction, so that the battle management module generates an action interaction based on the start position, the end position, and a preset attack action; and the battle management module stores the changed attack damage information to the queue management module, where the queue management module inserts the changed attack damage information at the rear, and deletes a first row of data at the front.

Preferably, the skill status information comprises: a fortification state, a process bar loading state and a garrison state of the game object.

The present invention further discloses a game object control method, comprising the following steps:

generating, by a server, group data for an object group including a plurality of game objects and object data for the game object;

receiving, by an intelligent terminal in communication connection with the server, the group data and the object data issued by the server;

receiving, by the intelligent terminal, the group data, and parsing the group data into first movement state data and first action state data, and receiving, by the intelligent terminal, the object data, and parsing the object data into second movement state data and second action state data;

when the intelligent terminal does not receive the group data and the object data within a preset period time domain, generating, by the intelligent terminal and based on the group data and the object data in a previous period, a first movement instruction and a first action instruction for the object group, and a second movement instruction and a second action instruction for the game object; and controlling, by the intelligent terminal, the object group to move based on the first movement instruction, controlling the game object to move based on the second movement instruction, controlling the object group to perform an attack action on another object group based on the first action instruction, and controlling the game object to perform an attack action on another object group based on the second action instruction.

when the intelligent terminal controls the object group and the game object to move, calculating whether a movement distance between a current position information of the game object and a second target position is less than a preset distance;

when the moving distance between the current position information of the game object and the second target position is greater than the preset distance, the intelligent terminal directly changes the current position information to the second target position;

when the moving distance between the current position information of the game object and the second target position is less than the preset distance, the intelligent terminal determines whether an included angle between a vector in which the second moving direction is located and a vector in which the game object and the second target position are located is less than 90°;

when the included angle between the vector in which the second movement direction is located and the vector in which the game object and the second target position are located is less than 90°, the intelligent terminal controls, in a directly proportional manner, a second moving speed and a distance between the current position information and the second target position based on the second speed correction constant; and when the included angle between the vector in which the second moving direction is located and the vector in which the game object and the second target position are located is greater than or equal to 90°, the intelligent terminal controls, in an inversely proportional manner, a second moving speed and a distance between the current position information and the second target position based on the second speed correction constant.

The present invention further discloses a computer-readable storage medium having a computer program stored thereon, wherein when the computer program is executed by a processor, the above steps are implemented.

After the technical solution is adopted, compared with the prior art, beneficial effects are as follows:

1. When thousands of units on a big map perform battle performance in the game, the state of each unit in a battle in a battlefield can be shown, users can perform subtler operations based on interactive information feedback;

2. When network connection between the intelligent terminal and the server fluctuates, the intelligent terminal can continue to perform movement and actions of game objects according to a prediction in a blank situation, and bringing continuous and uninterrupted interactive experiences to the users.

DETAILED DESCRIPTION

Advantages of the present invention are further described below with reference to the drawings and specific embodiments.

The exemplary embodiments are described in detail herein, and examples thereof are shown in the accompanying drawings. When the following description involves the drawings, unless otherwise indicated, the same numbers in different drawings indicate the same or similar elements. The implementations described in the following exemplary embodiments do not represent all implementations consistent with the present disclosure. Rather, the implementations are merely examples of devices and methods consistent with some aspects of the present disclosure as detailed in the appended claims.

The terms used in the present disclosure are only for the purpose of describing specific embodiments, and are not intended to limit the present disclosure. The singular forms of "a", "said" and "the" used in the present disclosure and the appended claims are also intended to include plural forms, unless the context clearly indicates other meanings. It should further be understood that the term "and/or" as used herein refers to and includes any or all possible combinations of one or more associated listed items.

It should be understood that although the terms first, second, third, etc. may be used in the present disclosure to describe various information, the information should not be limited to these terms. These terms are only used to distinguish the same type of information from each other. For example, without departing from the scope of the present disclosure, the first information may also be referred to as second information, and similarly, the second information may also be referred to as first information. Depending on the context, the word "if" as used herein can be interpreted as "when" or "while" or "in response to determining".

In the description of the present invention, it should be understood that the orientation or positional relationship indicated by the terms "longitudinal", "lateral", "upper", "lower", "front", "rear", "left", "right", "vertical", "horizontal", "top", "bottom", "inner", "outer", etc. are based on the orientation or positional relationship shown in the drawings, and are only for the convenience of describing the present invention and simplifying the description, and do not indicate or imply that the pointed device or element must have a specific orientation, or be constructed and operated in a specific orientation, and therefore cannot be understood as a limitation of the present invention.

In the description of the present invention, unless otherwise specified and limited, it should be noted that the terms "installed", "connected", and "connection" should be understood in a broad sense. For example, the connection can be a mechanical connection or an electrical connection, or may be internal communication between two elements, or may be a direct connection or an indirect connection through an intermediate medium. For the person of ordinary skill in the art, the specific meaning of the above terms can be understood according to specific conditions.

In the following description, the use of suffixes such as "module", "part" or "unit" used to indicate elements is only for the purpose of facilitating the description of the present invention, and have no specific meaning. Therefore, "module" and "part" can be mixed for using.

Figure 1:
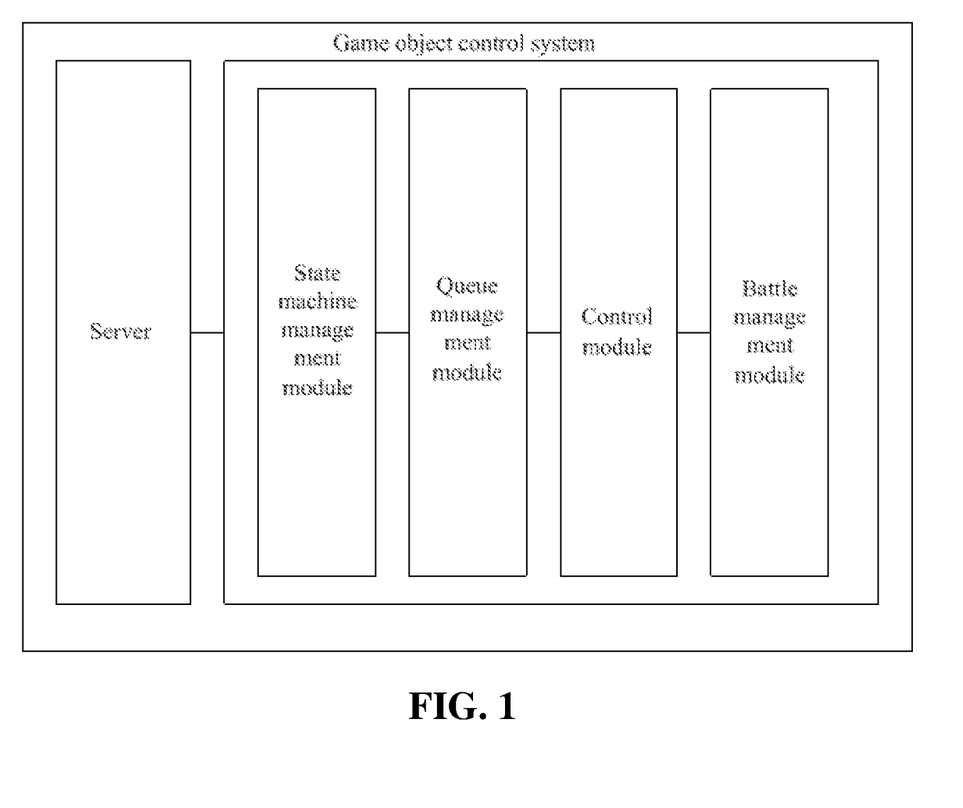
FIG. 1 is a structural diagram of a game object control system according to a preferred embodiment of the present invention.

Referring to FIG. 1, in a preferred embodiment, to implement continuous control of game objects in a game application program, a game object control system comprises:

A Server

An operator of the game application program builds a server to operate the game application program, and to run a main body of the game application program, and to manage data in the game application program, such as an object group on a big map. The object group comprises a plurality of game objects, such as individual soldiers and heroes in a user-controlled unit, that is, a unit composed of a plurality of individual soldiers is an object group. The server generates group data for the object group and object data for the game object, that is, data of the unit and data of each individual soldier in the unit.

An Intelligent Terminal

The user operates an intelligent terminal, and observes a state of the game object in the game application program on an interactive interface of the intelligent terminal, such as whether the game object is marching, whether the game object is attacking or defending, or whether the game object is releasing skills. Therefore, the intelligent terminal needs to be in communication connection with the server to receive the group data and the object data issued by the server.

Further, the intelligent terminal comprises the following modules:

A State Machine Management Module

Because the data for the object group is separated from the data for the game object, in the intelligent terminal, the group data and the object data are also separately distributed and processed. Specifically, the state machine management module manages the group data, and different states maintain their own state data.

The state machine is an abbreviation of a finite state machine, which is a mathematical model abstracted from operating rules of real things.

A Queue Management Module

Queue management is performed for the object data by using a special linear table. Therefore, the object data needs to be converted into individual behaviors that can be performed by individual soldier, and is managed by using a data structure of a queue. This queue is in a form that only allows to perform delete operations at the front of the table, and perform insert operations at the rear of the table, to overwrite old data in a timely manner and apply new data.

A Control Module

The control module is respectively connected to the state machine management module and the queue management module, and receives the group data and the object data. Generally speaking, the server periodically sends the group data and the object data to the intelligent terminal in a period time domain, for example, every 0.25 seconds. If in some scenarios, a wireless network or mobile network environment in which the intelligent terminal is located is poor, and when the group data and the object data sent by the server to the intelligent terminal cannot be received by the intelligent terminal in time, different from the prior art in which the intelligent terminal must wait for the network environment to be normal before continuing to control the game object, in this embodiment, the control module generates a first movement instruction, a first action instruction for the object group, and a second movement instruction and a second action instruction for the game object based on the group data and the object data received in a previous period or the last received group data and object data.

In other words, based on the received group data and object data, the intelligent terminal predicts a moving target of the object group and the game object according to the prediction logic, and a state after the movement, such as whether there is a need to launch an attack on another object group.

A Battle Management Module

Based on the first movement instruction, the first action instruction, and the second movement instruction and the second action instruction for the game object, the battle management module controls the object group to move based on the first movement instruction, controls the game object to move based on the second movement instruction, and controls the object group to perform an attack action on another object group based on the first action instruction, and controls the game object to perform an attack action on another object group based on the second action instruction. Therefore, regardless of the number of game objects included in the object group, the same operation can be performed on all game objects that are classified into the same object group, and because the amount of data that needs to be transmitted is small, in a scenario in which the network environment is relatively poor, better robustness is provided. On the other hand, if the network environment is worse and normal transmission between the server and the intelligent terminal is almost impossible, interaction between the game objects can still be presented to the user.

Preferably or alternatively, the first movement instruction includes: current position information (for example, coordinates of one or more grids in a big map), a first movement direction (which can be expressed in a form of a coordinate vector), a first moving speed (the number of grids passed or the distance passed per second), a first movement position in a next period time domain (the next time the intelligent terminal receives the group data, the position to which the object group should moves), a duration of the period time domain (an interval time between two adjacent group data sent by the server to the intelligent terminal), a first speed correction constant (that is calculated based on a first target position and the first movement direction, and that is a correction weight for the first moving speed) and a first target position (a final destination of the object group) of the object group. The first action instruction includes: attack status information and skill status information of the object group. The second movement instruction includes: current position information (such as coordinates of one or more grids in a big map), a second movement direction (which can be expressed in a form of a coordinate vector), a second moving speed (the number of grids passed or the distance passed per second), a second movement position in a next period time domain (the next time the intelligent terminal receives the object data, the position to which the game object should move), a duration of a period time domain (an interval time between two adjacent object data sent by the server to the intelligent terminal), a second speed correction constant (that is calculated based on a second target position and the second moving direction, and that is a correction weight for the second moving speed), and a second target position (a final destination of the game object) of the game object. The second action instruction includes: attack damage information and skill status information of the game object. Because a plurality of game objects constitutes an object group, movement attributes of the game object should be the same as that of the object group, that is, the current position information of the game object is centered on the current position information of the object group, and is offset by an offset distance. It can be understood that, if an object group includes a plurality of game objects, each game object has its own collision radius, each game object is distributed outward by spreading from the center of the object group, and adjacent game objects do not overlap, each game object is offset by a certain distance by using the object group as a center, that is, the second movement position is offset by an offset distance by using the first movement position as a center, and the second target position is offset by an offset distance by using the first target position as a center. In addition, in terms of movement attributes, the first movement direction is the same as the second movement direction, the first moving speed is the same as the second moving speed, and the first speed correction constant is the same as the second speed correction constant, so that the unit and the individual soldier are moved in a synchronization manner. That is, when the unit is moved, a center point of the unit is shifted to a next grid, a target point of the individual soldier is offset at the same time, and the individual soldier is moved with its target point, to implement the movement of the individual soldier.

In an actual situation, due to network fluctuations, the data sent by the server deviates greatly from performance of the intelligent terminal. To make the object group and the game object move smoothly, a preset distance as a critical value is set in the intelligent terminal. Specifically, when the battle management module controls the object group and the game object to move, whether a movement distance between current position information of the game object and a second target position is less than a preset distance is calculated, that is, whether a distance between the individual soldier and its final target position is less than the critical value is determined, and different actions are performed based on different determining results, for example:

1. When the moving distance between the current position information of the game object and the second target position is greater than the preset distance, the current position information is directly changed to the second target position, it indicates that the game object is farther away from the final target position, and if there is no updated object data, a next movement cannot be determined for the game object. Therefore, for smooth performance, the current position information is changed to the second target position. For the user, interaction performance is that the individual solider is instantaneously moved to the second target position. On the one hand, a result position can be fed back to the user. On the other hand, individual soldiers can be prevented from moving further away and a bug is prevented from occurring.

2. When the moving distance between the current position information of the game object and the second target position is less than or equal to the preset distance, it is determined whether an included angle between a vector in which the second moving direction is located and a vector in which the game object and the second target position are located is less than 90°, that is, whether an included angle between a direction of the target point and the movement direction of the game object is less than 90°.

3. When the included angle between the vector in which the second moving direction is located and the vector in which the game object and the second target position are located is less than 90°, it indicates that the game object is moved in a correct direction as a whole. In this regard, a target distance is kept directly proportional to the moving speed, and the second moving speed and the distance between the current position information and the second target position are controlled in a directly proportional manner based on the second speed correction constant, so that the game object presents interactive performance of chasing the second target position. If the network condition continues to be poor, the second speed correction constant can be gradually modified, for example, the game object presents a uniform deceleration motion, which serves as a buffer movement for the game object while waiting for the network to be repaired.

4. When the included angle between the vector in which the second movement direction is located and the vector in which the game object and the second target position are located is greater than or equal to 90°, it indicates that the game object is moved in a wrong direction as a whole or can be moved to the second target position only by traveling far. In this regard, a target distance is kept inversely proportional to the moving speed, and the second moving speed and the distance between the current position information and the second target position are controlled in an inversely proportional manner based on the second speed correction constant, so that the game object presents interactive performance of waiting for the second target position. If the network condition continues to be poor, the second speed correction constant can be gradually changed. For example, the game object presents a uniform deceleration motion or a uniform acceleration motion (depending on the target distance), which serves as a buffer movement for the game object while waiting for the network to be repaired.

In the above embodiment, for the target position nextPos of the game object in a next frame, a calculation formula is as follows:

nextPos=position+
  moveDir*speed*inDt*chasePercent, wherein, nextPos is a position of an individual solider in a next frame, Position is a current position of the individual solider, MoveDir is a movement direction, Speed is a current moving speed, InDt is time elapsed in the next frame, that is, a period time domain, and ChasePercent is a moving speed correction constant.

Preferably or alternatively, the attack status information includes identification information of an attacked object group, such as enemy selection data, that is, the attacked object group is which group in the big map. The attack damage information comprises: remaining state information of the game object in the attacked object group after the game object executes the second action instruction, such as remaining HP (health points) of the enemy individual soldier after being attacked, which can also be called single damage. The attack damage information comprises state change information of the attacked object group after the game object executes the second action instruction, such as group damage to an enemy unit. The group damage is relative health points, which indicates damage that is received by all individual soldiers of the enemy unit for one time. A calculation formula is as follows: Single damage=(current health points of enemy individual soldier−health points of enemy individual soldier after being damaged)+group damage. Data of the group damage does not need to be transmitted for damage to each solider, and therefore the transmission amount of network data can be greatly reduced to implement a battle having a scale of thousands of units. The attack damage information comprises number change information of game objects in the attacked object group after the game object executes the second action instruction, such as the dead enemy individual solider ID issued by the server and the enemy individual solider with the target HP less than or equal to 0, and kill data is added to an attack queue of our individual soldier. The attack damage information comprises a starting position and an ending position of an attack action when the game object executes the second action instruction, so that the battle management module generates an action interaction based on the starting position, the ending position and a preset attack action. For example, to change ammunition data, machine gun shooting is used as an example of the attack action, data of the individual solider is agreed by flag bits of starting the shooting and ending the shooting, the intelligent terminal previews shooting animation according to the local configuration and animation, and then inserts actual damage into the previewed shooting bullet. The battle management module stores the changed attack damage information to the queue management module, and the queue management module inserts the changed attack damage information from the rear, and deletes the first row of data from the front to ensure timely feedback and data synchronization from the intelligent terminal.

Preferably or alternatively, the skill status information comprises: a fortification state, a process bar loading state and a garrison state of the game object. For example, for the fortification state of the infantry, the process bar loading state of the artillery, and the garrison state, and performances are performed for these states based on different local configurations and data issued by the server, to implement richness of the game.

Through the above configuration, the battle performance of thousands of units on the big map can be presented, and the state of each unit in a battle in the battlefield can be presented, including health points, attack, skill, process bar loading, etc. Users can perform subtler operations based on the above information feedback.

Figure 2:
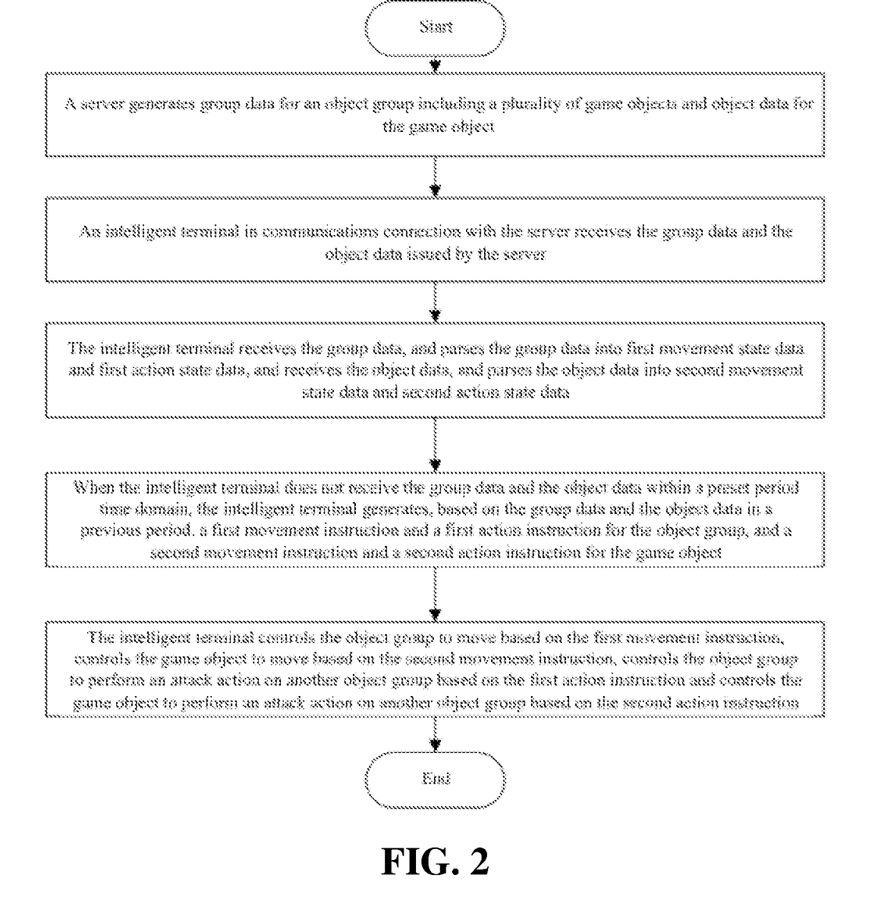
FIG. 2 is a schematic flowchart of a game object control method according to a preferred embodiment of the present invention.

Referring to FIG. 2, FIG. 2 is a schematic flowchart of a game object control method according to a preferred embodiment of the present invention. In this embodiment, the game object control method includes the following steps:

S100: A server generates group data for an object group including a plurality of game objects and object data for the game object.

S200: An intelligent terminal in communications connection with the server receives the group data and the object data issued by the server.

S300: The intelligent terminal receives the group data, and parses the group data into first movement state data and first action state data, and the intelligent terminal receives the object data, and parses the object data into second movement state data and second action state data.

S400: When the intelligent terminal does not receive the group data and the object data within a preset period time domain, the intelligent terminal generates, based on the group data and the object data in a previous period, a first movement instruction and a first action instruction for the object group, and a second movement instruction and a second action instruction for the game object.

S500: The intelligent terminal controls the object group to move based on the first movement instruction, controls the game object to move based on the second movement instruction, controls the object group to perform an attack action on another object group based on the first action instruction, and controls the game object to perform an attack action on another object group based on the second action instruction.

Preferably or optionally, the game object control method further includes the following steps:

S600: When the intelligent terminal controls the object group and the game object to move, whether a movement distance between current position information of the game object and a second target position is less than a preset distance is calculated.

S610: When the movement distance between the current position information of the game object and the second target position is greater than a preset distance, the intelligent terminal directly changes the current position information to the second target position;

S620: When the movement distance between the current position information of the game object and the second target position is less than the preset distance, the intelligent terminal determines whether an included angle between a vector in which a second moving direction is located and a vector in which the game object and the second target position are located is less than 90°.

S621: When the included angle between the vector in which the second moving direction is located and the vector in which the game object and the second target position are located is less than 90°, the intelligent terminal controls, in a directly proportional manner, a second moving speed and a distance between the current position information and the second target position based on a second speed correction constant.

S622: When the included angle between the vector in which the second movement direction is located and the vector in which the game object and the second target position are located is greater than or equal to 90°, the intelligent terminal controls, in an inversely proportional manner, a second moving speed and a distance between the current position information and the second target position based on a second speed correction constant.

The present invention further discloses a computer-readable storage medium having a computer program stored thereon, and the computer program is executed by a processor to implement the above steps.

Intelligent terminals can be implemented in various forms. For example, the terminal described in the present invention may include an intelligent terminal such as a mobile phone, a smart phone, a notebook computer, a PDA (personal digital assistant), a PAD (tablet computer), a PMP (portable multimedia player), and a navigation device, and a fixed terminal such as a digital TV and a desktop computer. It is assumed that the terminal is an intelligent terminal below. However, the person skilled in the art can understand that, in addition to elements specifically used for mobile purposes, the configuration according to the embodiments of the present invention can also be applied to fixed-type terminals.

It should be noted that the embodiments of the present invention have better implementations and do not limit the present invention in any form. Any person skilled in the art may use the technical content disclosed above to change or modify equivalent effective embodiments. However, any modifications or equivalent changes and modifications made to the above embodiments based on the technical essence of the present invention without departing from the content of the technical solution of the present invention still fall within the scope of the technical solution of the present invention.

The invention claimed is:

1. A game object control system, comprising a server and an intelligent terminal, wherein the server generates group data for an object group comprising a plurality of game objects and object data for the game object, and the intelligent terminal is in communication connection with the server and receives the group data and the object data issued by the server, wherein:
    the intelligent terminal comprises:
    a state machine management module that receives the group data, and parses the group data into first movement state data and first action state data;
    a queue management module that receives the object data, and parses the object data into second movement state data and second action state data;
    a control module that is respectively connected to the state machine management module and the queue management module, wherein when the intelligent terminal does not receive the group data and the object data within a preset period time domain, the control module generates and sends, based on the group data and the object data in a previous period, a first movement instruction and a first action instruction for the object group, and a second movement instruction and a second action instruction for the game object; and
    a battle management module that controls the object group to move based on the first movement instruction, controls the game object to move based on the second movement instruction, controls the object group to perform an attack action on another object group based on the first action instruction, and controls the game object to perform an attack action on another object group based on the second action instruction.

2. The game object control system according to claim 1, wherein,
    the first movement instruction comprises: current position information, a first movement direction, a first moving speed, a first movement position in a next period time domain, a duration of a period time domain, a correction constant for the first speed and a first target position of the object group;
    the first action instruction comprises: attack status information and skill status information of the object group;
    the second movement instruction comprises: current position information, a second movement direction, a second moving speed, a second movement position in a next period time domain, a duration of a period time domain, a correction constant for the second speed and a second target position of the game object; and
    the second action instruction comprises: attack damage information and skill status information of the game object, wherein
    the current position information of the game object is offset by an offset distance by using the current position information of the object group as a center;
    the second movement position is offset by the offset distance by using the first movement position as a center;
    the second target position is offset by the offset distance by using the first target position as a center; and
    the first movement direction is the same as the second movement direction, the first moving speed is the same as the second moving speed, and the correction constant for the first speed is the same as the correction constant for the second speed.

3. The game object control system according to claim 2, wherein,
    when the battle management module controls the object group and the game object to move, calculating whether a movement distance between the current position information of the game object and the second target position is less than a preset distance;
    when the moving distance between the current position information of the game object and the second target position is greater than the preset distance, directly changing the current position information to the second target position;
    when the moving distance between the current position information of the game object and the second target position is less than the preset distance, determining whether an included angle between a vector in which the second moving direction is located and a vector in which the game object and the second target position are located is less than 90°;
    when the included angle between the vector in which the second moving direction is located and the vector in which the game object and the second target position are located is less than 90°, controlling the second moving speed and a distance between the current position information and the second target position in a directly proportional manner based on the correction constant for the second speed; and when the included angle between the vector in which the second moving direction is located and the vector in which the game object and the second target position are located is greater than or equal to 90°, controlling the second moving speed and a distance between the current position information and the second target position in an inversely proportional manner based on the correction constant for the second speed.

4. The game object control system according to claim 2, wherein, the attack status information comprises identification information of an attacked object group;

the attack damage information comprises:

remaining state information of game objects in the attacked object group after the game object executes the second action instruction;

state change information of the attacked object group after the game object executes the second action instruction; and number change information of game objects in the attacked object group after the game object executes the second action instruction; and a start position and an end position of an attack action when the game object executes the second action instruction, so that the battle management module generates an action interaction based on the start position, the end position, and a preset attack action; and the battle management module stores the changed attack damage information to the queue management module, wherein the queue management module inserts the changed attack damage information at the rear, and deletes a first row of data at the front.

5. The game object control system according to claim 2, wherein:

the skill status information comprises: a fortification state, a progress bar loading state and a garrison state of the game object.

6. A game object control method, comprising the following steps:

generating, by a server, group data for an object group comprising a plurality of game objects and object data for the game object;

receiving, by an intelligent terminal in communication connection with the server, the group data and the object data sent by the server;

receiving, by the intelligent terminal, the group data, and parsing the group data into first movement state data and first action state data, and receiving, by the intelligent terminal, the object data, and parsing the object data into second movement state data and second action state data;

when the intelligent terminal does not receive the group data and the object data within a preset period time domain, generating and sending, by the intelligent terminal and based on the group data and the object data in a previous period, a first movement instruction and a first action instruction for the object group, and a second movement instruction and a second action instruction for the game object; and controlling, by the intelligent terminal, the object group to move based on the first movement instruction, controlling the game object to move based on the second movement instruction, controlling the object group to perform an attack action on another object group based on the first action instruction, and controlling the game object to perform an attack action on another object group based on the second action instruction.

7. The game object control method according to claim 6, wherein:

when the intelligent terminal controls the object group and the game object to move, calculating whether a movement distance between a current position information of the game object and a second target position is less than a preset distance;

when the moving distance between the current position information of the game object and the second target position is greater than the preset distance, the intelligent terminal directly changes the current position information to the second target position;

when the moving distance between the current position information of the game object and the second target position is less than the preset distance, the intelligent terminal determines whether an included angle between a vector in which the second moving direction is located and a vector in which the game object and the second target position are located is less than 90°;

when the included angle between the vector in which the second movement direction is located and the vector in which the game object and the second target position are located is less than 90°, the intelligent terminal controls, in a directly proportional manner, a second moving speed and a distance between the current position information and the second target position based on the correction constant for the second speed; and when the included angle between the vector in which the second moving direction is located and the vector in which the game object and the second target position are located is greater than or equal to 90°, the intelligent terminal controls, in an inversely proportional manner, a second moving speed and a distance between the current position information and the second target position based on the correction constant for the second speed.

8. A non-transitory computer-readable storage medium having instructions stored thereon that when executed by & one or more processors cause the one or more processors to perform operations comprising:

generating and sending by a server group data for an object group comprising a plurality of game objects and object data for the game object;

receiving by an intelligent terminal in communication connection with the server the group data and the object data sent by the server;

receiving by the intelligent terminal the group data, and parsing the group data into first movement state data and first action state data, and receiving by the intelligent terminal the object data, and parsing the object data into second movement state data and second action state data;

when the intelligent terminal does not receive the group data and the object data within a preset period time domain, generating and sending by the intelligent terminal and based on the group data and the object data in a previous period a first movement instruction and a first action instruction for the object group, and a second movement instruction and a second action instruction for the game object; and controlling by the intelligent terminal the object group to move based on the first movement instruction, controlling the game object to move based on the second movement instruction, controlling the object group to perform an attack action on another object group based on the first action instruction, and controlling the game object to perform an attack action on another object group based on the second action instruction.

9. The non-transitory computer-readable storage medium according to claim 8, having further instructions stored thereon that, when executed by the one or more processors cause the one or more processors to perform operations comprising:
- when the intelligent terminal controls the object group and the game object to move, calculating whether a movement distance between a current position information of the game object and a second target position is less than a preset distance;
- when the moving distance between the current position information of the game object and the second target position is greater than the preset distance, the intelligent terminal directly changes the current position information to the second target position;
- when the moving distance between the current position information of the game object and the second target position is less than the preset distance, the intelligent terminal determines whether an included angle between a vector in which the second moving direction is located and a vector in which the game object and the second target position are located is less than 90°,
- when the included angle between the vector in which the second movement direction is located and the vector in which the game object and the second target position are located is less than 90°, the intelligent terminal controls, in a directly proportional manner, a second moving speed and a distance between the current position information and the second target position based on the correction constant for the second speed; and
- when the included angle between the vector in which the second moving direction is located and the vector in which the game object and the second target position are located is greater than or equal to 90°, the intelligent terminal controls, in an inversely proportional manner, a second moving speed and a distance between the current position information and the second target position based on the correction constant for the second speed.

* * * * *